Jan. 6, 1931.          G. KAUFFMANN, JR          1,788,198
ILLUMINATING MEANS FOR GAUGE GLASSES
Filed Feb. 28, 1928
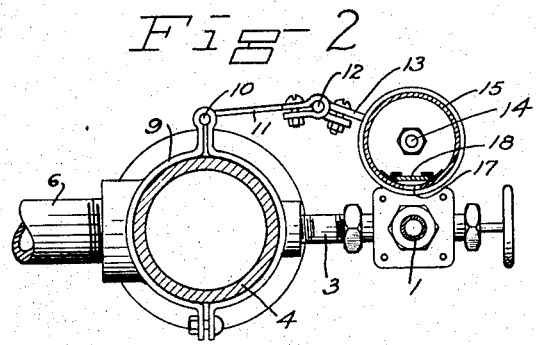
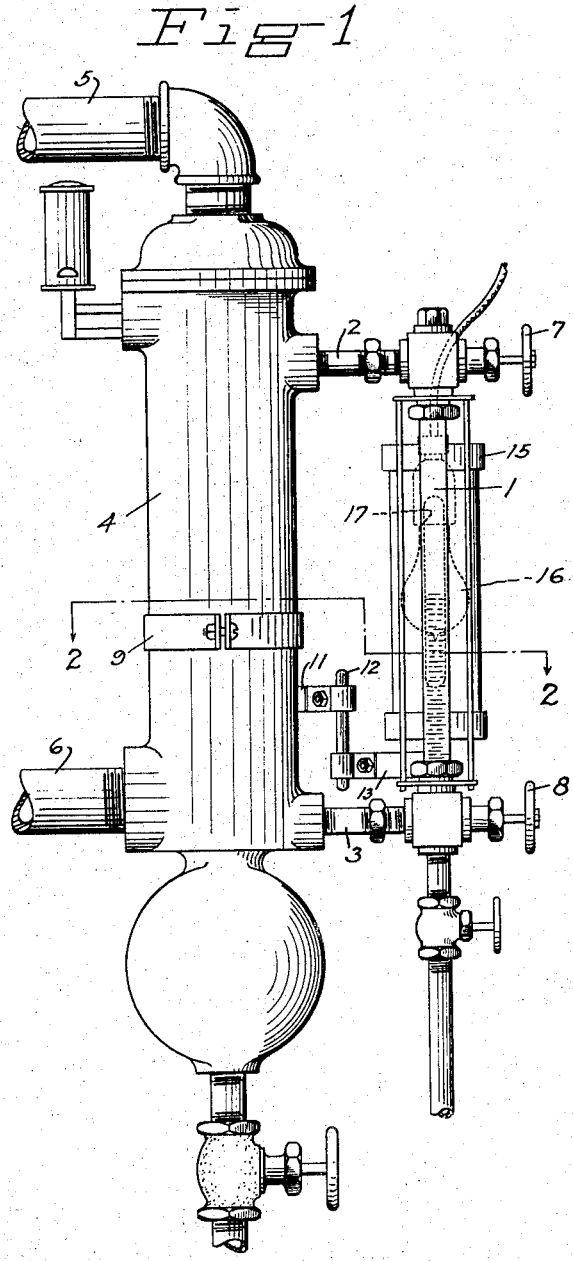
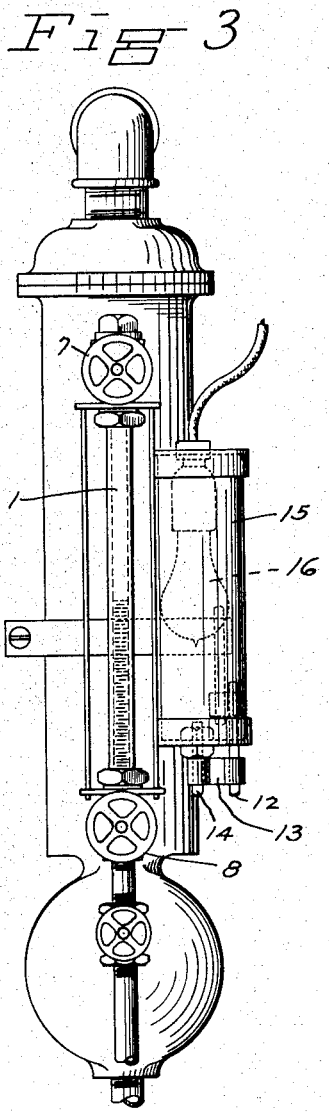
INVENTOR
George Kauffmann Jr.
BY
Gifford & Scull
ATTORNEYS Patented Jan. 6, 1931

1,788,198

UNITED STATES PATENT OFFICE

GEORGE KAUFFMANN, JR., OF WASHINGTON, NEW JERSEY

ILLUMINATING MEANS FOR GAUGE GLASSES

Application filed February 28, 1928. Serial No. 257,630.

This invention relates to a novel and improved means for illuminating the gauge glass of a boiler, and will be best understood from the following description and the annexed drawings. In these drawings, in which I have shown a selected embodiment of the invention Fig. 1 is a side view of my invention as applied to the gauge glass, Fig. 2 is a section on the line 2—2 of Fig. 1, Fig. 3 is a view taken from the right of Fig. 1.

For the purpose of illustration, I have shown my invention as used in conjunction with a gauge glass of the cylindrical type, although it is to be understood that it is not limited specifically to that type of glass.

The glass is indicated at 1 and the usual connections 2 and 3 are also shown by means of which the glass is connected to the usual water column 4, which in turn is connected by the pipes 5 and 6 to the boiler, which is not shown. The usual valves 7 and 8 are provided for controlling the passage of steam or water through the connections 2 and 3 to the glass.

I prefer to mount my device upon the water column 4, and for this purpose, I provide a clamp 9 by which the device may be secured in position at any desired height of the column. Rotatably supported by the column is a pin 10, to which is secured a link 11 which in turn rotatably supports a pin 12 to which is secured a second link 13. The outer end of this link 13 rotatably supports a pin 14 to which is secured the casing 15. This casing may be of any suitable form, but is herein shown as cylindrical in shape and through the top there is suspended a suitable lamp 16.

It will be seen that the casing with the lamp therein may be placed at any desired position with respect to the gauge glass 1, any desired adjustment being made possible by the arrangement described above. On the side of the casing toward the gauge glass, it is provided with an elongated slot 17 extending substantially parallel to the length of the gauge glass and preferably of a width equal to the inside diameter or dimension of the gauge glass. Between the slot and the lamp is disposed a glass 18 which is preferably red in color.

In operation, the casing with the lamp therein is preferably adjusted until it is brought into close proximity to the gauge glass, substantially as shown in the drawings. I have found that by making the slot 17 relatively narrow and preferably of less width than the gauge glass itself, and by using a red glass 18, the result is that an observer will see a red column of liquid in the glass, without seeing the walls of the glass on opposite sides of the column of liquid.

The water in the glass is brilliantly illuminated throughout its height, but the glass above the liquid I have found is not illuminated in such a way as to substantially change its color. The result is a very marked contrast between the water in the gauge glass and the glass itself.

One of the disadvantages which has been found with gauge glasses, is that they soon become dirty, either on the inside or the outside, or both and this is particularly so where the water has been treated with chemicals before entering the boiler. Not only have I found that my invention will be effective with a dirty glass, but I further find that its effectiveness seems to be increased when a deposit of chemicals has accumulated on the glass.

By this invention, I have found that the level of water may be readily observed at a substantial distance, and in fact, from any part of the boiler room at which the glass is within the range of vision of the observer. The level may also be observed, even with the gauge glass disposed at a substantial height above the floor of the boiler room, and the water is plainly seen at all levels which it may occupy in the glass.

I have found that all of the above advantages result from my invention in actual practice, and the improved result appears to be caused by the provision of a narrow beam of red light concentrated on the gauge glass, or more properly speaking on the water within the glass. In order to aid in this concentration, the inner surface of the casing 15 is preferably of a reflecting material.

By the adjusting means shown, the device may be easily adapted for use with different sizes of glass.

I claim:

1. In combination, a gauge glass tube, an opaque enclosure including a source of light therein and having a slot co-extensive with the exposed gauge glass length, said slot having a width only equal to the internal diameter of the gauge glass tube, a swinging bracket supporting the opaque enclosure and permitting the slot to be brought into close adjustment with the gauge glass tube, and a colored glass strip behind the slot and spaced from the edges thereof and having the edges of the slot overlapping the edges of the colored glass strip whereby they project into and cut off the light rays thereby producing a sharp line of delineation for the light projected onto the gauge glass tube interior.

2. In a gauge glass apparatus; a water column member adapted for boiler connection; a vertical gauge glass connected to and supported by the water column; and means for illuminating a column of liquid in the glass comprising, a cylindrical casing having a narrow vertical slot in its upright side, a clamp embracing the water column member and adjustably secured thereon, swinging connections supported by the clamp, means for rotatably supporting the casing on a part of said connections, an electric lamp within the casing, and a colored glass arranged relative to the casing as a chord is to a circle; the portions of the casing bordering the slot being spaced a substantial distance exteriorly of the glass and the above parts being so proportioned and positioned that an observer sees a lighted column of water within the gauge glass of a color the same as the color of the glass without seeing the walls of the glass on opposite sides of the column of water.

GEORGE KAUFFMANN, Jr.